United States Patent [19]
Kuno et al.

[11] Patent Number: 4,835,429
[45] Date of Patent: May 30, 1989

[54] FLEXIBLE PRINTED CABLE CONNECTED TO AN INNER MOST END OF MOTOR COIL

[75] Inventors: Hiroyuki Kuno; Yujirou Iino, both of Tokyo, Japan

[73] Assignee: Kabushiki Kaisha Toshiba, Kawasaki, Japan

[21] Appl. No.: 30,072

[22] Filed: Mar. 25, 1987

[30] Foreign Application Priority Data

Mar. 28, 1986 [JP] Japan .................................. 61-68720

[51] Int. Cl.$^4$ ......................... H04R 9/04; H02K 3/26; H02K 3/47
[52] U.S. Cl. ........................................ 310/71; 310/13; 310/208; 310/DIG. 6
[58] Field of Search .......................... 174/117 FF, 151; 310/71, 268, 13, 116, 208, DIG. 6; 336/192

[56] References Cited

U.S. PATENT DOCUMENTS

| | | | |
|---|---|---|---|
| 4,476,404 | 10/1984 | Bygdnes | 310/71 |
| 4,539,442 | 9/1985 | Puls et al. | 174/117 FF |
| 4,636,677 | 1/1987 | Yasuhara | 310/71 |
| 4,701,650 | 10/1987 | Maemine | 310/268 |

FOREIGN PATENT DOCUMENTS 53-70310  4/1978  Japan .
58-31662  7/1983  Japan .

*Primary Examiner*—Patrick R. Salce
*Assistant Examiner*—D. L. Rebsch
*Attorney, Agent, or Firm*—Cushman, Darby & Cushman

[57] ABSTRACT

The rotary actuator comprises sector-shaped magnets, with a coil located therebetween. A flexible printed cable is fixed on one surface of the coil, and opposes the magnets. The flexible printed cable extends inside the coil. The innermost end of a conductive wire constituting the coil is connected to the flexible printed cable inside the coil, without being guided between the coil and the magnets. Power is supplied to the coil through a cable located between the coil and the magnets. The coil generates a magnetic flux in response to the input current. A force acts on the coil by way of an interaction between the magnetic flux from the coil and the magnetic flux from the magnets. For this reason, the coil rotates about a rotating shaft of a head-support mechanism mounted on the coil. The head is then moved and positioned at a target track.

4 Claims, 4 Drawing Sheets

FLEXIBLE PRINTED CABLE CONNECTED TO AN INNERMOST END OF MOTOR COIL

BACKGROUND OF THE INVENTION

The present invention relates to an improvement in a head drive mechanism for a disk apparatus.

First, the structure of a conventional head drive mechanism will be described, with reference to FIG. 1. FIG. 1 is a schematic exploded perspective view of coil assembly 1 and magnet section 2, which together constitute the main part of a rotary actuator for a conventional magnetic disk apparatus. Assembly 2 is arranged as follows:

Conductive wire 12 is wound into a coil, to thereby constitute coil 11. Coil bobbin 13 for holding coil 11 is mounted therearound. The outermost end 14 of wire 12 is soldered to conductive pin 15. The innermost end of wire 12 is guided along the upper surface of coil 11 and is soldered to conductive pin 17.

Magnet section 2 is arranged as follows:

A pair of yokes 23 and 26 are arranged so as to oppose each other. Four sector-shaped magnets 21, 22, 24, and 25 having an identical shape are mounted as pairs 21, 22 and 24, 25 on yokes 23 and 26, respectively. Magnets 21, 22, 24, and 25 and yokes 23 and 26 constitute a closed-loop magnetic circuit.

Coil assembly 1, shown in FIG. 1, is inserted in a space in magnet section 2. An actuator support (not shown) and a head arm are fixed on coil bobbin 13. A magnetic head is mounted at the distal end of the head arm, to perform data read/write accessing.

The operation of the structure shown in FIG. 1 will now be described below.

A drive current is supplied to coil 11 via pins 15 and 17. In response to the drive current, coil 11 generates a magnetic flux. The interaction between the magnetic flux generated by coil 11 and that generated by magnets 21, 22, 24, and 25 applies an electromagnetic force to coil assembly 1. Assembly 1 is then rotated about a shaft (not shown) at a predetermined angle. In this way, the heads are positioned at a predetermined track of a disk-like recording medium.

Along with an increase in the operating speed of magnetic disk apparatuses in recent years, demand has arisen for an increase in the seek speed of the actuators used in the magnetic disk apparatuses.

SUMMARY OF THE INVENTION

It is an object of the present invention to provide a head drive mechanism for a disk apparatus which has a large drive capacity.

In order to achieve the above object of the present invention, there is provided a head drive mechanism for a disk apparatus, comprising means (21-26) for generating a magnetic flux, thrust generating means including a coil (11) for generating a magnetic flux in response to a drive current, and generating an electromagnetic drive force, in cooperation with the magnetic flux from the magnetic flux generating means, the thrust generating means being adapted to drive a head arm and hence move a head, and a flexible printed cable (35) interposed between the magnetic flux generating means (21-26) and the thrust generating means (11), and connected to the thrust generating means (11), the flexible printed cable (35) supplying the drive current to the thrust generating means (11).

With the above arrangement, the innermost end (16) of the wire (12) in the drive mechanism is connected to the flexible printed cable (35) inside the head drive mechanism. For this reason, the innermost end (16) inside the head drive mechanism need not be guided outside through the coil (11) and the magnetic flux generating means (21-26). Since the thickness of the flexible printed cable (35) is sufficiently smaller than the diameter of the wire (12), the distance (L) between the coil (11) and the magnetic flux generating means (21-26) can be reduced, as compared with the conventional arrangement. When the distance (L) between the coil (11) and the magnetic flux generating means (21-26) is reduced, the magnetic flux generated by the magnetic flux generating means (21-26) and applied to the coil (11) can be increased. The coil (11) can thus generate a greater drive force. For this reason, even if the head arm is heavy, it can be driven smoothly. In addition, the seek time can be reduced.

DETAILED DESCRIPTION OF THE PREFERRED EMBODIMENTS

To increase the seek speed of the actuator, it is beneficial if distance L (FIG. 1) between the magnets 21, 22, 24, 26 is reduced, to thereby increase the magnetic flux density between the magnets 21, 22, 24, 25.

Figure 1:
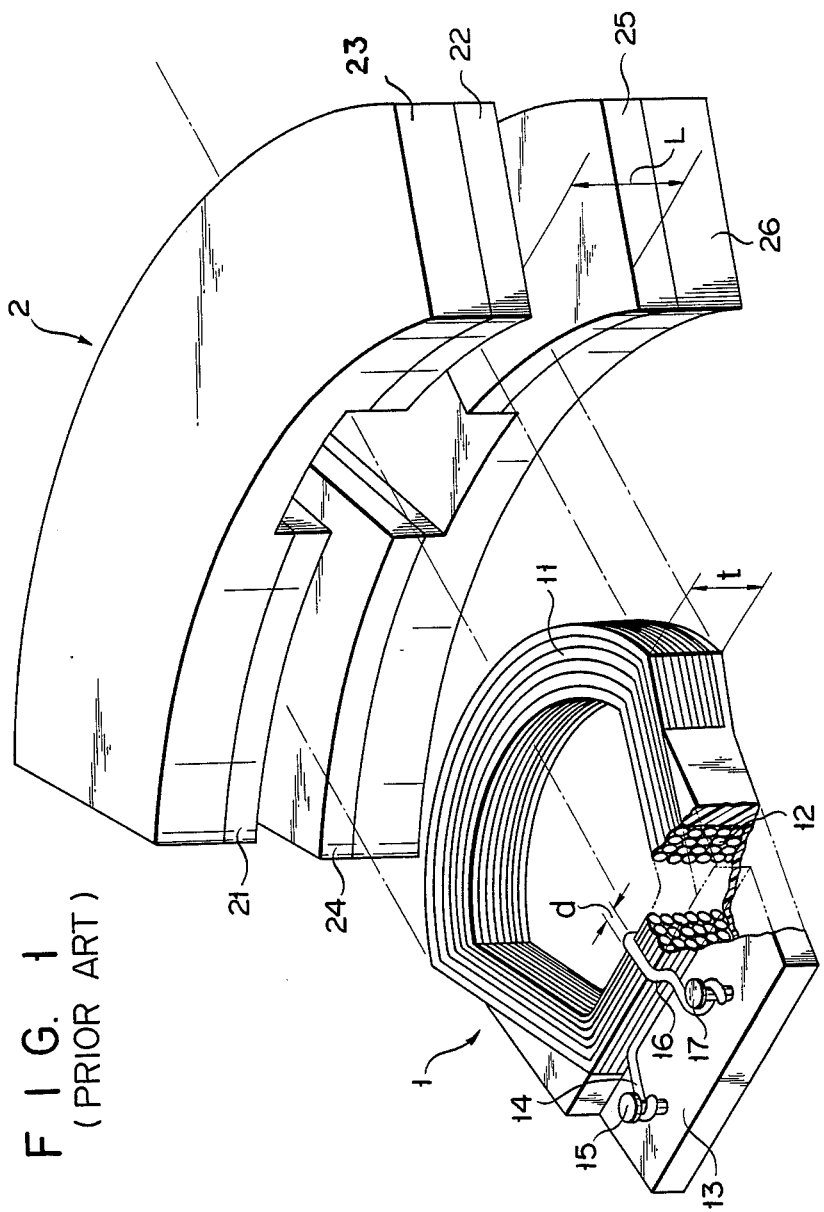
FIG. 1 is an exploded perspective view for explaining the arrangement of a conventional rotary actuator.

However, in the structure shown in FIG. 1, the reducing of the spaces between magnets 21 and 24 and between 22 and 25, in order to increase the magnetic fluxes therebetween is limited, for the following reason: The thickness of coil 11 is given as t and the diameter of wire 12 is given as d. Thickness T1 of coil assembly 1 is the thickness obtained by adding thickness t of coil 11 to diameter d of winding start portion 16 extending along coil 21. Therefore, distance L between the magnets cannot be sufficiently close to thickness t of coil 11 ($L \geq t+d$). As a result, the magnetic flux density in the spaces cannot be sufficiently increased.

Figure 2:
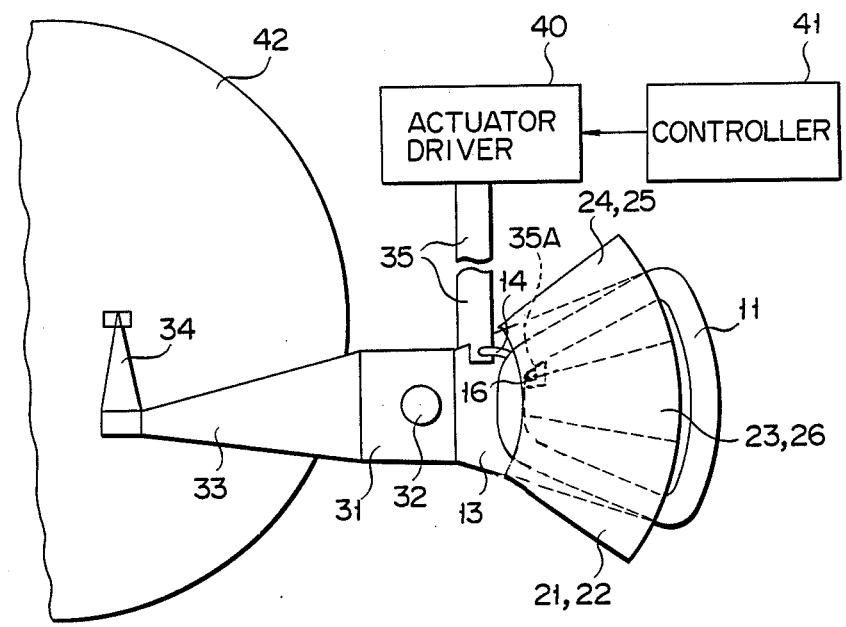
FIG. 2 is a plan view for explaining the arrangement of a head drive mechanism according to an embodiment of the present invention.
Figure 3:
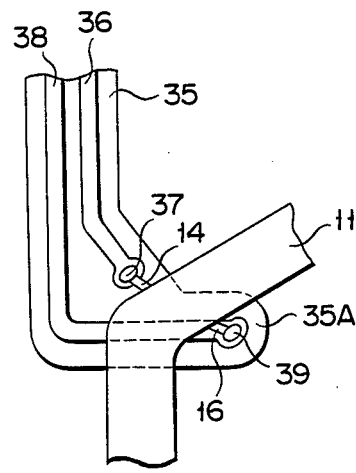
FIG. 3 is an enlarged plan view showing the characteristic portion of FIG. 4, so as to explain the characteristic portion of the embodiment shown in FIG. 2.
Figure 4:
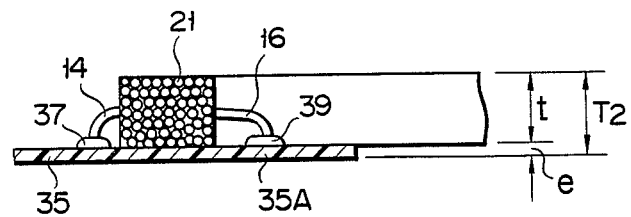
FIG. 4 is a sectional view corresponding to the view in FIG. 3.

To achieve the above object, a magnetic disk apparatus according to an embodiment of the present invention is constructed as is shown in FIGS. 2 to 4. The same reference numerals used FIG. 1 denote the same parts in FIGS. 2 to 4, and thus, a detailed description thereof will be omitted.

FIG. 2 shows a head drive mechanism for a magnetic disk apparatus according to an embodiment of the present invention. The basic components shown in FIG. 2 are substantially the same as those shown in FIG. 1. A coil assembly is inserted in a space in a magnet section.

A conductive wire is wound into a coil, to thereby constitute coil 11 of the coil assembly. Coil bobbin 13 for holding coil 11 is mounted thereamound. Actuator support 31 is fixed to bobbin 13. Rotating shaft 32 extends through support 31. Head arm 33 is fixed to support 31. Magnetic head 34 is fixed to the distal end of arm 33, to perform data read/write access. Bobbin 13 is formed by molding, for example, a plastic material. A light metal such as Al or Mg may be used to constitute bobbin 13, so as to increase the rigidity of the coil assembly.

The magnet section includes a pair of yokes 23 and 26 arranged opposite to each other. Sector-shaped magnets 21, 24 are mounted on surface face of yoke 23. Magnets 22, 25 are mounted facing magnets 21, 24, on a surface face of yoke 26. Magnets 21, 22, 24, and 25 and yokes 23 and 26 constitute a closed-loop magnetic circuit.

In the arrangement shown in FIG. 2, flexible printed cable 35 is attached to coil bobbin 13. Cable 35 extends inside coil 11, as indicated by reference numeral 35A. Outermost end 14 of wire 22 constituting coil 11 is soldered to cable 35 situated outside coil 11. Innermost end 16 of wire 12 constituting coil 11 is soldered to flexible printed cable 35 situated inside coil 11.

In order to clarify the characteristic feature of the structure described above, the relationship between coil 11, ends 14 and 16, and flexible printed cable 35 is illustrated, in an enlarged view, in FIG. 3. Parts not relevant to the description are omitted.

FIG. 4 is an enlarged sectional view for explaining the relatinship between ends 14 and 16, and cable 35. As is apparent from FIGS. 3 and 4, cable 35 is attached to coil bobbin 13. End 14 of the wire of coil 11 is fixed to conductive portion 36 of cable 35, by means of soldered portion 37. Winding start portion 16 of coil 11 is fixed through soldered portion 39 to conductive portion 38 of cable 35 which extends inside coil 11.

Flexible printed cable 35 is connected to actuator driver 40. Driver 40 is then connected to controller 41.

Figure 5:
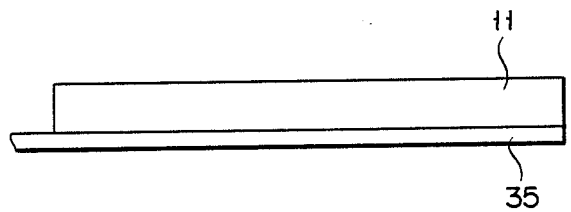
FIG. 5 is a side view showing a modification of the arrangement shown in FIG. 2.

The operation of the head drive mechanism having the arrangement shown in FIGS. 4 to 6 will now be described below.

Controller 41 supplies a drive signal to actuator driver 40. The drive signal designates a target track of the disk-like recording medium. Upon reception of the drive signal, driver 40 supplies a drive current to coil 11 via ends 14 and 16 of the wire and conductive portions 36 and 38 of cable 35. In this case, the drive current is required to cause head 34 to position itself at a target track. Coil 11 generates a magnetic flux in response to the drive current. The interaction between the magnetic flux generated by coil 11 and that generated by magnets 21, 22, 24, and 25 applies an electromagnetic force to coil 11, whereby actuator is rotated about rotating shaft 32. Since driver 40 and controller 41 control this rotation, head 34 is positioned at the target track. Head 34 reads out data from disk 42 or writes data therein.

Let us consider the effects of the embodiment inrelation to the thickness of the coil assembly. Referring to FIG. 4, if the thickness of coil 11 is given as t and thickness of the flexible printed cable is given as e, thickness T2 of the coil assembly is given as a value obtained by adding thickness t of coil 11 to thickness e of cable 35, i.e. T2=t+e. However, thickness T1 of the conventional coil assembly shown in FIG. 1 is T1=t+d. Thickness e of cable 35 is much less than diameter d of coil 11 (i.e., d>>e). Therefore, relation T1>T2 can be easily established. In other words, thickness T2 of the coil assembly of the present invention can be considerably less than thickness T1 of the conventional coil assembly (i.e., T1>T2). According to this embodiment, magnet gap L shown in FIG. 1 can be reduced by the reduction in thickness of the conventional coil assembly. The magnetic flux density in the magnet gap can thus be increased. An increase in magnetic flux density in the magnet gap increases the electromagnetic force acting on coil 11. As a result, the drive capacity of the actuator is increased, and a seek operation can be performed at a higher speed.

As is shown in FIG. 4, the flexible printed cable is partially attached to coil 11. However, as can be seen in the sectional view of FIG. 5, coil 21 may be attached to the entire area (i.e., to cover the surface of coil 11) of coil 11. When the flexible printed cable is attached to the entire surface of one side of coil 11, the strength of the coil assembly can be increased without the need to increase the thickness thereof.

The present invention is not limited to a rotary actuator, but is applicable also to a linear actuator. The application of the linear actuator will now be described with reference to FIG. 6.

Figure 6:
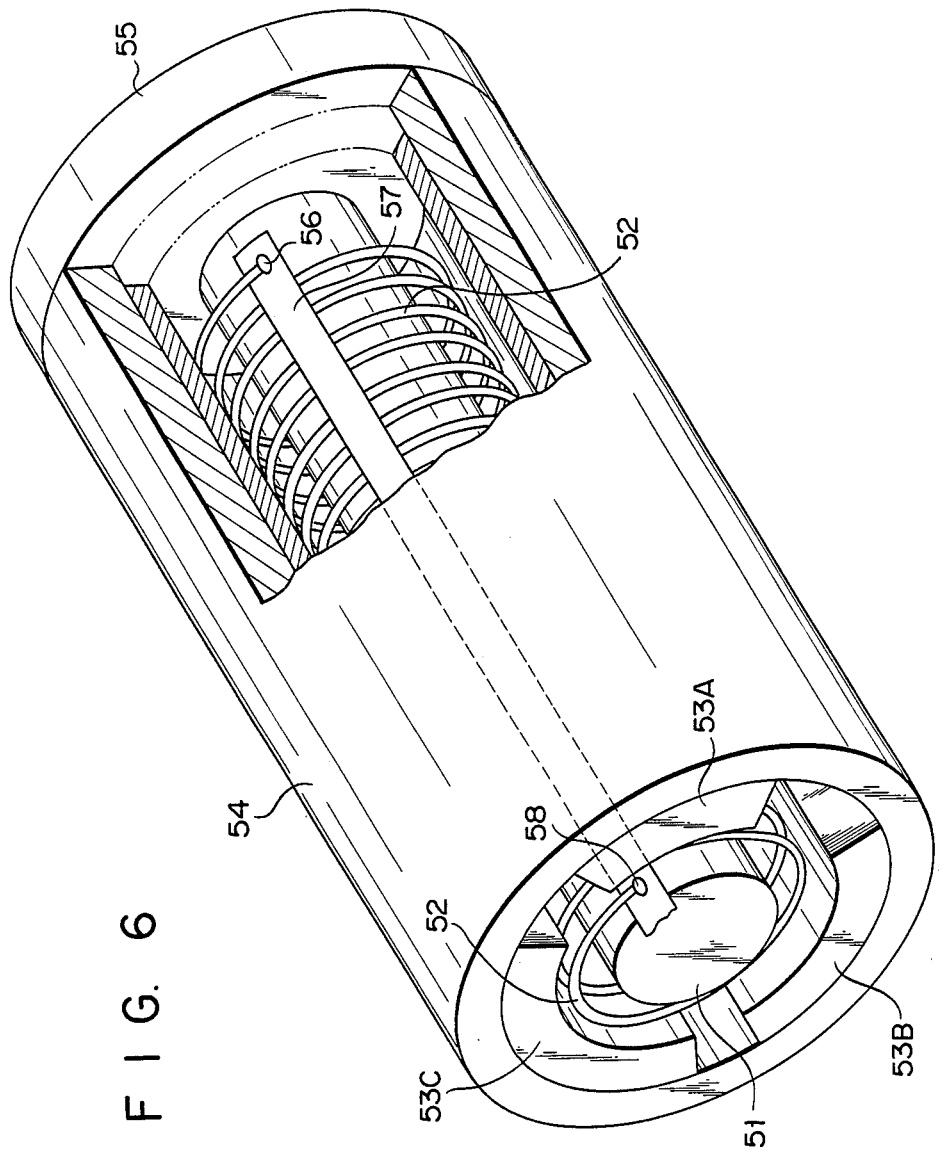
FIG. 6 is a perspective view of a linear actuator according to another embodiment of the present invention.

As is shown in FIG. 6, the linear actuator comprises: core 51, coil 52 spaced apart from core 51 and wound around a cylinder; magnets 53A to 53C spaced apart from and cylindrically disposed to cover coil 52; cylinder 54 made of a permeable material (e.g., iron) to constitute a magnetic path; and press member 55. In this embodiment, innermost end 56 of coil 52 is soldered to flexible printed cable 57. Cable 57 is attached to coil 52 and is led forward with respect to the surface of FIG. 6. Winding start end 58 (the front side in FIG. 6) of coil 52 is lead and is soldered to cable 57.

A drive current is supplied to coil 52 via flexible printed cable 57, and coil 52 is moved along core 51. A head arm (not shown) coupled to coil 52 is driven so as to position the magnetic head at the target track. The innermost coil end of the conventional linear actuator is guided to the outer side of the motor, through the coil and the magnets. For this reason, the distances between magnets 53 and coil 52 cannot be sufficiently short. However, according to this embodiment, since the thickness of printed cable 57 can be less than that of the wire between coil 52 and magnets 53, therefore, the magnetic flux density in the gap can be increased to a sufficient level. The increase in magnetic flux density increases the drive capacity of the actuator (voice coil motor) and allows a high-speed seek operation to be achieved. Flexible printed cable 57 may be guided between core 51 and coil 52.

The head drive mechanism is not limited to that for a magnetic disk apparatus, but can be extended to a head drive mechanism for an optical disk apparatus. Moreover, the present invention is not limited to the head drive mechanism, but can be extended to various coil movable motors.

What is claimed is:

1. A motor comprising:
    magnet means for generating a magnetic flux;
    means for constituting a magnetic path through which the magnetic flux from said magnet means passes;
    a coil arranged in part of said magnetic path and constituted by winding a plurality of turns of a conductive wire; and
    a flexible printed cable arranged in said magnetic path to supply power to said coil, connected to an innermost winding end of said coil, and led outside said motor.

2. A motor according to claim 1, wherein said motor comprises a rotary voice coil motor, said magnetic path includes a pair of yokes, said magnet means comprises magnets fixed on said yokes, said coil is inserted in a gap between said magnets, and said printed cable is fixed on one surface of said coil, extends over at least an innermost portion of said coil, and is connected to an innermost winding end of said conductive wire constituting said coil, inside said coil.

3. A motor according to claim 1, wherein said magnetic path includes a columnar member made of a permeable material, said coil being cylindrically wound to cover said columnar member, said magnet means comprises a plurality of magnets arranged to cylindrically cover said coil, said printed cable is located between said columnar member and said magnet, and an end of said coil, which is located inside said motor, is directly connected to an end of said coil inside said motor.

4. A motor as in claim 1 wherein said motor is a movable coil-type motor in which said coil is movable.

* * * * *